March 27, 1973 MASAHARU TOYAMA ETAL 3,723,177
METHOD OF PRODUCING A GROUP III-V SEMICONDUCTOR COMPOUND
Filed March 17, 1970
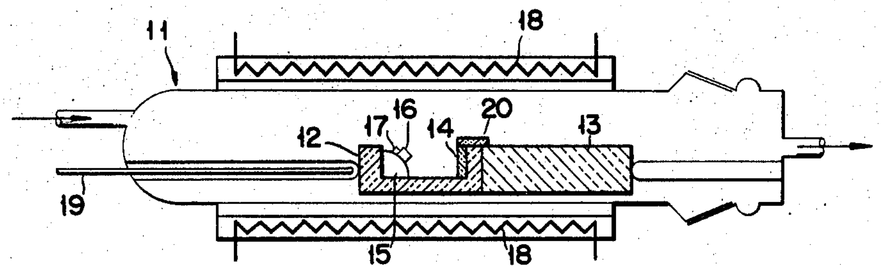
INVENTOR.
BY Masaharu Toyama
Tetuo Sekiura
Kemon, Palmer & Estabrook 3,723,177

METHOD OF PRODUCING A GROUP III-V SEMICONDUCTOR COMPOUND

Masaharu Toyama, Kashiwa, and Tetuo Sekiwa, Tokyo, Japan, assignors to Tokyo Shibaura Electric Co., Ltd., Kawasaki-shi, Japan Filed Mar. 17, 1970, Ser. No. 20,215
Claims priority, application Japan, Mar. 18, 1969, 44/20,108
Int. Cl. B44d *1/18*
U.S. Cl. 117—217 2 Claims

ABSTRACT OF THE DISCLOSURE

A compound semiconductor epitaxially grown on a transparent and insulating substrate of an aluminium oxide, the compound being formed of elements of Groups III and V of the periodic table. The Group III–V compound semiconductor is produced by epitaxially growing a single crystal of a Group III–V compound from a gallium solution incorporating aluminum, which serves to better the wetting of the substrate.

BACKGROUND OF THE INVENTION

This invention relates to a compound semiconductor formed by epitaxially growing from the liquid phase a semiconducting crystal of a Group III-V compound on a transparent insulating substrate, and to a method of producing such a compound.

Epitaxial growth of semiconducting crystals on transparent and electrically insulating crystal substrate involves two important functions. One is an electrical insulation by the substrate crystal and the other is that the crystal may serve to form an optical window when it is used as an optical element. A luminescent element in which a p-n junction is formed particularly of GaAs, GaP or a mixed crystal thereof, such as $Ga(As_{1-x}, P_x)$ or $(Ga_{1-x}, Al)As$, emits the infrared and a visible light ranging from red to green. Such a luminescent element is thus expected to be in wide use in future as a new type of light source.

Various processes, such as a vapor process, solution process and a fusion process, have been heretofore suggested for growing a semiconducting crystal of a Group III-V compound. Of these processes a liquid phase epitaxy can best provide a crystal for use as a luminescent element. According to this process, a single crystal is grown on a suitable substrate crystal by dissolving in a Ga solution a semiconductor material of a Group III-V compound and gradually cooling the solution while maintaining the material in contact with the substrate crystal. It is known, for example, that a substrate crystal of GaP is used to grow a GaP crystal thereon and a GaAs crystal is used to overgrow a GaP crystal. The substrate or seed crystal, however, is greatly limited in size since it is presently difficult to obtain a large single crystal using GaP. Although GaAs provides a crystal sufficiently large for cutting a large substrate, it has an absorption edge at 1.42 ev. (about 9000 A.) and does not permit visible rays to penetrate therethrough, so that a substrate made of this material is not advantageous as a luminescent element because of this absorption of light. It will thus be necessary to remove such a substrate when high external luminous efficiency is desired.

SUMMARY OF THE INVENTION

The object of this invention is to provide a compound semiconductor suitable for use as a high efficiency luminescent element, and also a method in which the said compound is grown on a transparent and insulating substrate from liquid phase. Accordingly, the invention provides a Group III-V compound semiconductor formed by epitaxially growing from the liquid phase a single crystal of a Group III-V compound on a transparent insulating substrate, and also a method in which said single crystal is epitaxially grown on said substrate from a gallium solution containing a Group III-V compound having a close affinity with the substrate.

Aluminum to be contained in a Ga solution can be applied to the Ga solution either by adding Al to a composition of the Ga solution before being solved, or by preliminarily depositing Al, thus dissolving the Al into the Ga solution.

BRIEF EXPLANATION OF THE DRAWING

A single figure shows a schematic view of a heating furnace to explain one example of forming, by liquid phase epitaxy, the compound semiconductor according to this invention.

DETAILED DESCRIPTION OF THE INVENTION

An electrically insulating transparent substrate may be formed of a crystalline aluminum oxide, such as sapphire, corundum or ruby, or quartz. The aluminum oxide may contain such an amount of impurities as will give no adverse effect on the original crystalline structure. Thus, the term "crystalline aluminum oxide" and the like used herein shall mean to include a crystalline aluminum oxide containing impurities in the amount described above. A single crystal of a Group III-V compound is epitaxially grown from the liquid phase on said substrate. A compound semiconductor thus produced is further subjected to diffusion or liquid phase epitaxy by Zn to form a p-n junction, which may be used as a luminescent element of a light source having a high luminous efficiency.

In the liquid phase epitaxy of the Group III-V compound crystal on the crystalline substrate, it is necessary to improve the affinity or wetting between the substrate and a gallium solution. For example, it is known that a crystal containing the major component of $Al_2O_3$ has a very bad affinity with gallium. In particular, around room temperature a crystal face of $Al_2O_3$ may be ultimately rendered wet by Ga by adhering the Ga solution thereon, but at temperatures above 500° C. at which liquid phase epitaxy takes place, the crystal face becomes less wettable and thus repels Ga.

It has been found that wetting can be improved by adding to the Ga solution a metal having a good affinity with the substrate or by depositing a metal having a good affinity on the substrate in advance of epitaxial growth. For example, when the substrate is formed of crystalline aluminum oxide, addition of a small amount of aluminum to the solution greatly improves wetting.

The Group III-V compounds applicable in this invention include GaAs, GaP, $Ga(As_{1-x}, P_x)$, $(Ga_{1-x}, Al_x)$ As and $(Ga_{1-x}, Al_x)P$. Various known techniques are available to carry out liquid phase epitaxy. An example is the Nelson process (H. Nelson—Epitaxial growth from the liquid state and its application to the fabrication of tunnel and laser diodes, RCA Rev. 24, page 603 (1963)). Further, the various conditions as employed heretofore, such as growth temperature and growth time, will also be applicable to this invention. When a mixed crystal, such as $Ga(As_{1-x}, P_x)$ is to be grown, for example, the Ga solution may contain GaAs and GaP as well as a small amount of aluminum. In the case of $(Ga_{1-x}, Al_x)$ As and $(Ga_{1-x}, Al_x)P$, the amount of Al to be added to the solution may be increased. When GaAs or GaP is grown according to the method of this invention, there is a possibility that aluminium contained in the solution is partly introduced into the crystal formed. However, the solubility of the aluminum-containing crystal to the Ga solution is very small and a layer containing the aluminum is limited only to exist at the boundary or interface between the crystal and the substrate, with the result that the layer itself constitutes a pure crystal. When compared with an aluminum-free crystal, the Al-containing crystal has its terminal point of absorption at a point closer to short wave length side, so that the Al-containing layer lying at the interface between the crystal and the substrate will bring about no adverse effect in case it is used as a luminescent element. The amount of Al to be added to the solution is not restrictive, but may be suitably determined upon necessity.

The invention will be more fully understood from the following examples.

EXAMPLE 1

A single crystal of sapphire serving as a substrate is placed in a graphite boat positioned in the center of a heating surface. On the sapphire substrate is suitably deposited a heat sink thereby to allow latent heat to easily escape at the time of crystal formation by precipitation. 4.0 g. of Ga, 100 mg. of GaAs and 0.3 mg. of Al are placed on the substrate. While passing a stream of gaseous hydrogen, the furnace is heated to a temperature of 800° C. and maintained at that temperature for 30 minutes, and thereafter allowed to be cooled by switching off a heater power source. It is found that a single crystal of GaAs of 86μ thick is uniformly grown on the crystal face of the sapphire substrate.

EXAMPLE 2

GaAs is grown on a sapphire substrate using a device shown in the figure according to the Nelson process. A graphite boat 12 is secured in the center of a heating furnace 11 capable of tilting at angles about ±30°, and is connected at one end to a heat sink 13. A single crystal of a sapphire substrate 14 is stood against the wall of the boat 12 at its side closer to the heat sink 13, and 4.0 g. of Ga 15, 100 mg. of GaAs 16 and about 0.2 mg. of Al 17 are supplied along the opposite wall of the boat. The furnace 11 is inclined in such a manner that the substrate lies at a position higher than that of the supply, and heated by a heater 18, with passage of a stream of hydrogen, for 20 minutes at 800° C. to permit the GaAs, Al and the Ga to be uniformly fused. The furnace is then inclined in the opposite direction such that the substrate may lie in a lower position, whereby the Ga solution is poured onto the substrate 14. After further maintained for 20 minutes at 800° C., the substrate is cooled by switching off the power source. It is observed that a single crystal of GaAs having a uniform thickness of 94μ is formed on the entire surface of the sapphire substrate 14. The reference numerals 19 and 20 designate a thermocouple and a means for fastening the substrate in position, respectively.

EXAMPLE 3

A similar GaAs single crystal is grown in a similar manner as in Example 2 except that aluminum is preliminarily applied on the sapphire substrate 14 in a thickness less than 1μ either by vapor deposition or spattering. It is observed that preliminary deposition of Al upon the substrate 14 achieves a similar effect as compared with addition of Al to the Ga solution. Accordingly, in this case, the addition of the Al to the Ga solution is not necessarily required.

EXAMPLE 4

The process described in Example 2 is repeated except that a mixture of the Ga and the Al heated and fused at 100° C. to 300° C. is preliminarily deposited on the sapphire substrate 14. It is found that the crystal thus formed is similar to the one obtained under Example 2, and that the addition of the Al to the Ga solution is not necessarily required as explained in Example 3 for obtaining the similar effect.

EXAMPLE 5

A combination of 4.0 g. Ga, 200 mg. GaP and 0.4 mg. Al is used as a liquid phase and allowed to contact a sapphire substrate in a similar manner as in Example 1. While passing a stream of hydrogen, the furnace is heated to 1100° C. at which it is maintained for 30 minutes and thereafter cooled by switching off a heater power. A Gap single crystal of 110μ thick is found to be uniformly overgrown on the substrate.

EXAMPLE 6

A combination of 4.0 g. Ga, 200 mg. GaP and 0.5 mg. Al as a liquid phase is heated for about 20 minutes at 1100° C. in a similar manner described in Example 2 to permit the GaAs and Al to be uniformly dissolved into the Ga. The Ga solution thus formed is poured onto the substrate by reversing the furnace and cooled after being maintained further for 20 minutes at 1100° C., to grow a Ga single crystal having a uniform thickness of 101μ on the substrate.

EXAMPLE 7

A combination of 4.0 g. Ga, 500 mg. GaAs, 100 mg. GaP and 0.3 mg. Al is similarly treated as in Example 2 and is heated at 1000° C. for 20 minutes with a stream of hydrogen to allow the GaAs, GaP and Al to dissolve into the Ga. The Ga solution is poured onto the substrate by reversing the furnace and cooled after being maintained at 1000° C. for another 20 minutes. On the substrate is found the formation of a mixed crystal of $$Ga(_{0.7}, P_{0.3})$$

of 50 to 60μ thick.

EXAMPLE 8

4.0 g. Ga, 100 mg. GaAs, and 4 mg. Al are heated at 900° C. for 20 minutes in a similar manner as described in Example 2 to allow the GaAs and Al to be dissolved into the Ga. The Ga solution obtained is poured onto the substrate by reversing the furnace and cooled after being further maintained at that temperature for 20 minutes. It is observed that the thickness of the layer grown amounts to 20 to 30μ and that the layer has the compositions $(Ga_{0.6}Al_{0.4})$ at its portion engaging the substrate and $(Ga_{0.9}Al_{0.1})As$ at its surface portion.

EXAMPLE 9

The procedure outlined in Example 6 is repeated except that the Ga, GaP and Al respectively weigh 4.0 g., 200 mg. and 0.5 mg. and that 0.1 mg. Te is used as source of impurities. This results in the growth of an *n*-GaP crystal ($n=2\times10^{17}$ cm.$^{-3}$ room temperature). Zn is then diffused into the crystal using an ordinary diffusion process. In particular, the *n*-GaP crystal is placed in one side of a quartz tube and Zn in the opposite side thereof. The crystal and the Zn are heated, respectively, at 900° C. and 750° C. for 2 hours to effect diffusion, and then maintained, respectively, at 800° C. and 400° C. for 3 hours to effect annealing. The resultant crystal is cut into a 0.5 mm. x 0.5 mm. size to obtain a p-n junction. The p-n junction with an underlying sapphire substrate is adhered on a gold-plated stem. By passing a forward current of 10 ma., it emits green light and displays a luminous efficiency of 0.01%.

In this example, Zn is diffused to form a p-n junction, but it should be understood that p-n junctions may be epitaxially grown from the liquid phase, namely by adding Zn to Ga, GaP, etc. as the liquid phase. It should also be understood that various substances apparent to those skilled in the art may be used instead of or in addition to Zn to provide various luminescent elements. For example, $Ga_2O_3$ and Zn may be used to provide a luminescent element which emits red light.

What we claim is:

1. A method of producing a light emitting semiconductor device comprising providing a substrate of crystalline aluminium oxide, applying aluminum on said substrate in a thickness less than 1μ and epitaxially growing a single crystal of a Group III-V compound upon said substrate from a solution consisting essentially of gallium and a Group III-V compound.

2. The method according to claim 1 wherein said aluminum oxide is sapphire.

References Cited

UNITED STATES PATENTS

| | | | |
|---|---|---|---|
| 3,433,684 | 3/1969 | Zanowick et al. | 317—235.42 |
| 3,476,593 | 11/1969 | Lehrer | 317—235.42 |
| 3,484,662 | 12/1969 | Hagon | 317—234.8 |
| 3,433,686 | 3/1969 | Marinace | 117—106 A |
| 3,537,029 | 10/1970 | Kressel et al. | 331—94.5 |
| 3,397,094 | 8/1968 | Webb | 117—106 A X |
| 3,424,955 | 1/1969 | Seiter et al. | 317—234 |
| 3,347,976 | 6/1969 | Faust, Jr., et al. | 148—1.5 |

OTHER REFERENCES

H. Nelson, Epitaxial Growth from the Liquid State and Its Applications to the Fabrication of Tunnel and Laser Diodes. In RCA Review, pp. 603–606. December, 1963.

Brennan, J. J., and Pask, J. A., Effect of Nature of Surfaces on Wetting of Sapphire by Liquid Aluminum. In J. of the Am. Cer. Soc. 51 (10): pp. 569–573.

Rupprecht, H., Woodall, J. M., Pettit, 6 D. Efficient Visible Electroluminescence at 300° k. From $Ga_{1-x}Al_xAs$, p-n Junctions Grown by Liquid-Phase Epitaxy. In Applied Physics Letters, 11 (3): pp. 81–83. Aug. 1, 1967.

Handbook of Chemistry and Physics, 42nd Ed., Cleveland, Ohio, Chemical Rubber Publishing Co., 1960, pp. 2682, 2692.

CAMERON K. WEIFFENBACH, Primary Examiner

U.S. Cl. X.R.

148—171